2 Sheets--Sheet 1.
T. FAIRBANKS.
Railroad Track Scales.
No. 168,629. Patented Oct. 11, 1875.
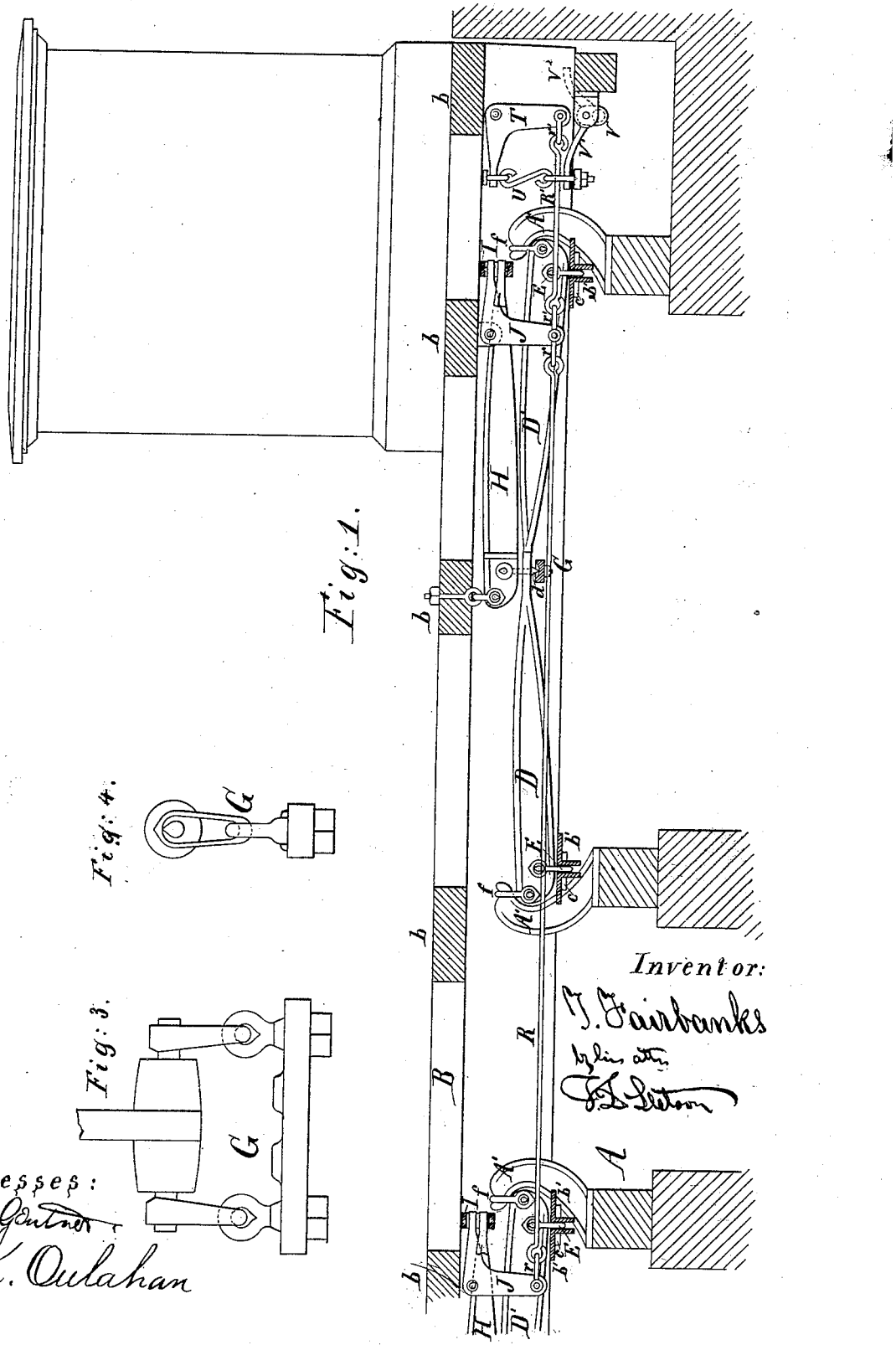

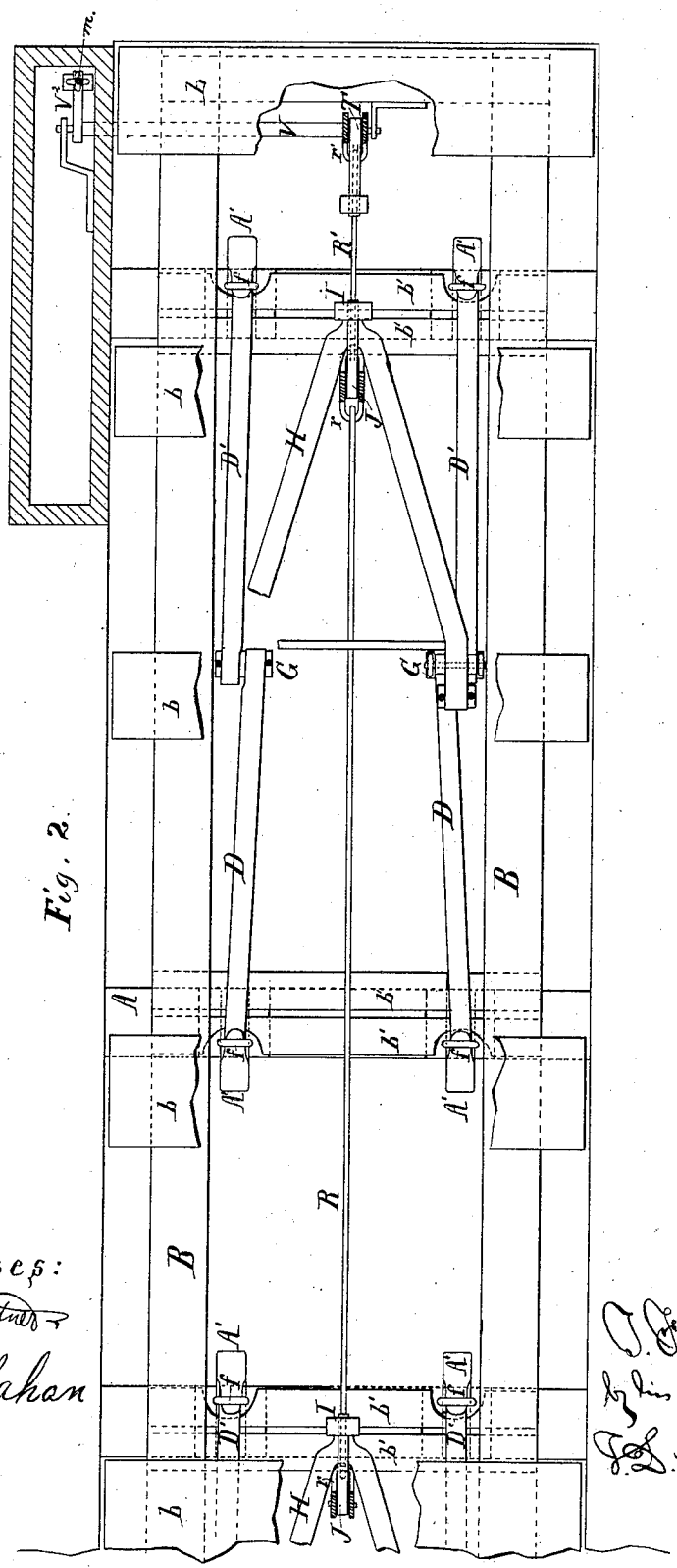

UNITED STATES PATENT OFFICE.

THADDEUS FAIRBANKS, OF ST. JOHNSBURY, VERMONT.

IMPROVEMENT IN RAILROAD-TRACK SCALES.

Specification forming part of Letters Patent No. 168,629, dated October 11, 1875; application filed August 30, 1875.

*To all whom it may concern:*

Be it known that I, THADDEUS FAIRBANKS, of St. Johnsbury, Caledonia county, in the State of Vermont, have invented certain new and useful Improvements relating to Railroad-Track Scales, of which the following is a specification:

I have, in a patent to me, dated May 11, 1875, described a scale of moderate length, adapted for weighing hay and analogous purposes, in which four first levers, receiving their load at four separate points, combine to communicate the indication of the weight through a single lever reaching out laterally to the weigh-rod.

In that scale there was no provision, and could not be without a reconstruction of the entire arrangement, for combining a number of such sets, so as to allow the weight to be received from the platform on a greater number of first levers.

My present arrangement attains that end, and allows the use of an indefinite number of such sets under a single long platform, so as to weigh a train of cars of any desired length without subjecting the platform to any considerable strain. The sets of levers are short, and mounted near together, so that the bearing-points are distributed along the entire length of the platform. If three sets are employed, there will be twelve bearing-points where the main platform transmits the weight of itself and its load upon a corresponding number of first levers. If there are ten sets, there will be forty bearing-points and forty first levers.

My platform is free to swing to a reasonable extent in all directions without abrading the working-surfaces or deranging the weighing action. All the levers beyond the first-levers, and which serve to communicate the strains therefrom to the weigh-rod, are mounted on the platform, so that any settling or movement of the platform is shared by them.

The accompanying drawings form a part of this specification, and represent what I consider the best means of carrying out the invention.

Figure 1 is a central longitudinal section, and Fig. 2 is a plan view and horizontal section.

Some of the top planks of the platform are represented as removed in both views, and those which are shown are represented in Fig. 2 as broken away at the center to better exhibit the working parts.

Similar letters of reference indicate like parts in all the figures.

A is the fixed frame-work. B B are the longitudinal timbers of the platform, ordinarily termed "platform-sticks," and *b b* are some of the cross-planks which form the top. These planks *b b* are made of selected sound wood, and are those which support the lever-work. They are furnished in the shop with the proper attachments for the levers, and are sent with the scale to the distant points where the scale is required. The additional planks required for the top of the platform may be added by an ordinary carpenter afterward. Angle-irons *b′ b′* extend across between the lower surfaces of the platform-sticks B, and are firmly fixed thereto, and are adapted to perform the important function of receiving the entire weight of the platform and its load, and of transmitting it to the first levers D D through the medium of loops E, which are engaged with the cross-irons *b′ b′* by means of pin *c*. The fulcrums of the first levers D are supported upon fixed hooks or standards A′ through the medium of links *f*. When any disturbing force tends to swing the platform longitudinally the links *f* swing correspondingly lengthwise of the track. When any force tends to swing the platform laterally the links *f* roll upon their supporting-hooks A′. The inclination of the first levers D, which is necessitated by this movement, is allowed for by the bearing at the other end, the long arm of the first levers being equipped with a conical point, *d*, instead of a knife-edge, through which the force is transmitted to the next link.

I group the first levers in sets of four. One pair, represented by D D, extend longitudinally of the track in one direction, and another pair, represented by D′ D′, extend in the opposite direction, and are mounted at the proper distance therefrom, so that the long arms of the levers D and D′ on either side of the track terminate side by side. The end of each carries a conical point, *d*, extending downward, which transmits the force thereof in a manner which allows the first levers to move sidewise to any desired extent. Each link G is wide enough to receive the ends both of D and D', and is provided with sockets, which may be conical, but more flaring than the cone-points $d$. These links G transmit the force to a second lever, H, which is peculiarly formed in a V shape. It is, in effect, a double lever at the large end, but the long arms extend obliquely, and are joined together, so as to make one lever of the whole. The load is transmitted from this peculiar second lever H through a link, I, to a third lever, J, which is of bell-crank form.

Bell-cranks or knee-levers have been long and successfully used in scales. Their function is to transmute a vertical force into a horizontal one. In this case I prefer to make the the knee-levers equal-armed, so that the force is not increased or diminished in the changing. The knee-levers J are equipped with properly-inclined knife-edges, which are supported in bearings in eyes rigidly fixed on the under side of the platform-plank above. In other words, the bearing for the knife-edge $j$ is capable of efficiently resisting the resultant of the horizontal and the vertical strain.

I use the term "nest" to indicate the levers and connections aggregated to transmit their force through any given lever J. There may be many such sets or nests of four first levers D D D' D', thus united together, and with the force of each, properly reduced by the ratios of the several levers, communicated to their respective knee-levers J.

I have shown in Fig. 1 only one set of first levers thus equipped with a part of another set. The figure shows sufficient of the other set to represent clearly its knee-lever J.

The force is communicated from one knee-lever to the other or others by means of straight horizontal rods R, which engage with loops $r$ adapted to form proper bearings for the knife-edges at the lower extremities of the knee-levers. There may be any number of the sets of first levers, and a corresponding number of knee-levers J, each lever J being harnessed to its next neighbor of corresponding form and proportions by means of a rod, R, and loop $r$.

The series of knee-levers J, thus extending along the center of the track, communicate their horizontal pull through a further rod, R', and loops $r'$ to the last bell-crank lever T. The function of this is to transmute the horizontal force again into a vertical one. The extremity of the horizontal arm of the lever T is connected by a link, U, to a horizontal arm, $V^1$, which is fixed on a cross-shaft, V, turning on knife-edges and extending laterally out beyond the railroad-track, and beyond the sides of the platform under the weigh-box to the ordinary weigh-rod, to which it communicates its force by means of a second arm, $V^2$.

The weigh-box and its adjuncts, the weigh-rod, weighing-beam, &c., may be of any ordinary or suitable character.

I can, if preferred in any case, mount the weigh-box and its connections at or near the middle of the scale instead of at one end. In such case the knee-levers J of all the sets of first levers beyond the weigh-box may communicate with another knee-lever (not represented) mounted in reverse position below the knee-lever T, and communicating its force through a pushing-link to the arm $V^1$, or to another similar arm mounted parallel thereto.

My improved scale may be equipped with all the ordinary provisions for withstanding wear, and allowing for irregular motions and the like. It may have adjustable nose-irons at one or more points, care being taken to prevent their being improperly tampered with. The link G receiving the strain, and consequently partaking of the motion of two of the first levers D and D' turning on different centers, is subject to a twisting motion, which is allowed for by peculiarly compounding the link, so as to have a yielding eye or loose joint in each side, as indicated by Figs. 3 and 4. This allows the lower part of the link to turn as the first levers D D' rise and sink, and this turning is accommodated by the turning of these eyes. One of the upright sides of the link will turn in one direction, and the other in the other direction; or if, in consequence of the swinging of the platform longitudinally, both incline in the same direction, one inclines more than the other; in other words, the flexible eyes allow the link to twist. This twisting motion is very little; but I believe it is sufficient to render this provision important.

The mounting of the levers H and J of each nest on the platform B not only fortifies the construction against danger of derangement from unequal settling and analogous disturbances in the position of the parts, but allows me to manufacture scales in a more advanced state of completion at the shop, and to ship them to distant points in a condition which will require little skill or labor in setting up.

I propose use check-rods, (not represented,) performing their ususal functions, to restrain the horizontal motion of the platform; but such rods are almost necessarily a little loose.

My arrangement of the levers in each set, and my connection of the several sets, although apparently complex, will, I believe, keep in perfect adjustment for an unusually long period, and it allows the swinging of the platform to any extent allowed by the check-rods, or even in case of the omission or fracture of one or more check-rods, it allows a swinging of the platform in every possible direction to a greater extent than usual without any derangement.

The platform may, as before intimated, swing longitudinally by the longitudinal swinging of the first loops $f$ E, or the platform may swing from side to side by a rolling motion of the first loops $f$ on the supporting-hooks A'.

I claim as my improvement in railroad-track scales—

The nests or sets of first levers D D' and second levers H, in combination with the knee-levers J and with connections communicating the weight from the entire series of nested levers D D' H to the last lever V, and thus to the weigh-rod m, as herein specified.

In testimony whereof I have hereunto set my hand this 25th day of August, 1875, in the presence of two subscribing witnesses.

THADDEUS FAIRBANKS.

Witnesses:
ELIJAH D. BLODGET,
WM. P. FAIRBANKS.